(12) United States Patent
Dedhia

(10) Patent No.: US 9,053,457 B2
(45) Date of Patent: Jun. 9, 2015

(54) SYSTEM AND METHOD FOR CHANGING CATEGORISATION DATA IN RELATION TO SPEND ANALYSIS REPORTS IN REAL TIME

(75) Inventor: Aatish Dedhia, Mumbai (IN)

(73) Assignee: Zycus Infotech Pvt. Ltd., Mumbai (IN)

( * ) Notice: Subject to any disclaimer, the term of this patent is extended or adjusted under 35 U.S.C. 154(b) by 194 days.

(21) Appl. No.: 13/443,862

(22) Filed: Apr. 10, 2012

(65) Prior Publication Data

US 2012/0271879 A1    Oct. 25, 2012

(51) Int. Cl.
G06F 15/16 (2006.01)
G06Q 10/10 (2012.01)
G06Q 10/06 (2012.01)
G06Q 10/08 (2012.01)

(52) U.S. Cl.
CPC ............... *G06Q 10/10* (2013.01); *G06Q 10/06* (2013.01); *G06Q 10/087* (2013.01)

(58) Field of Classification Search
CPC ...... G06Q 10/06; G06Q 10/087; G06Q 10/10
USPC .............................. 709/203, 206; 705/30, 301
See application file for complete search history.

(56) References Cited

U.S. PATENT DOCUMENTS

| | | | |
|---|---|---|---|
| 2003/0149578 A1* | 8/2003 | Wong | 705/1 |
| 2006/0111921 A1* | 5/2006 | Chang et al. | 705/1 |
| 2007/0055597 A1* | 3/2007 | Patel et al. | 705/35 |
| 2007/0192165 A1* | 8/2007 | Haggerty et al. | 705/10 |
| 2008/0033876 A1* | 2/2008 | Goldman et al. | 705/42 |
| 2008/0046347 A1* | 2/2008 | Smith et al. | 705/30 |
| 2009/0222365 A1* | 9/2009 | McGlynn et al. | 705/30 |

\* cited by examiner

*Primary Examiner* — Hitesh Patel
(74) *Attorney, Agent, or Firm* — Preston Smirman; Smirman IP Law, PLLC

(57) ABSTRACT

A computer based system for changing categorization data, in relation to spend analysis reports, in real time, the system comprising a processor unit; and a computer readable medium storing instructions executable by the processor unit comprising a client side processing means adapted to transmit a user generated request for change, in real time and a server side processing means adapted to receive said transmitted requested change, in real time, for effecting said requested change.

11 Claims, 1 Drawing Sheet

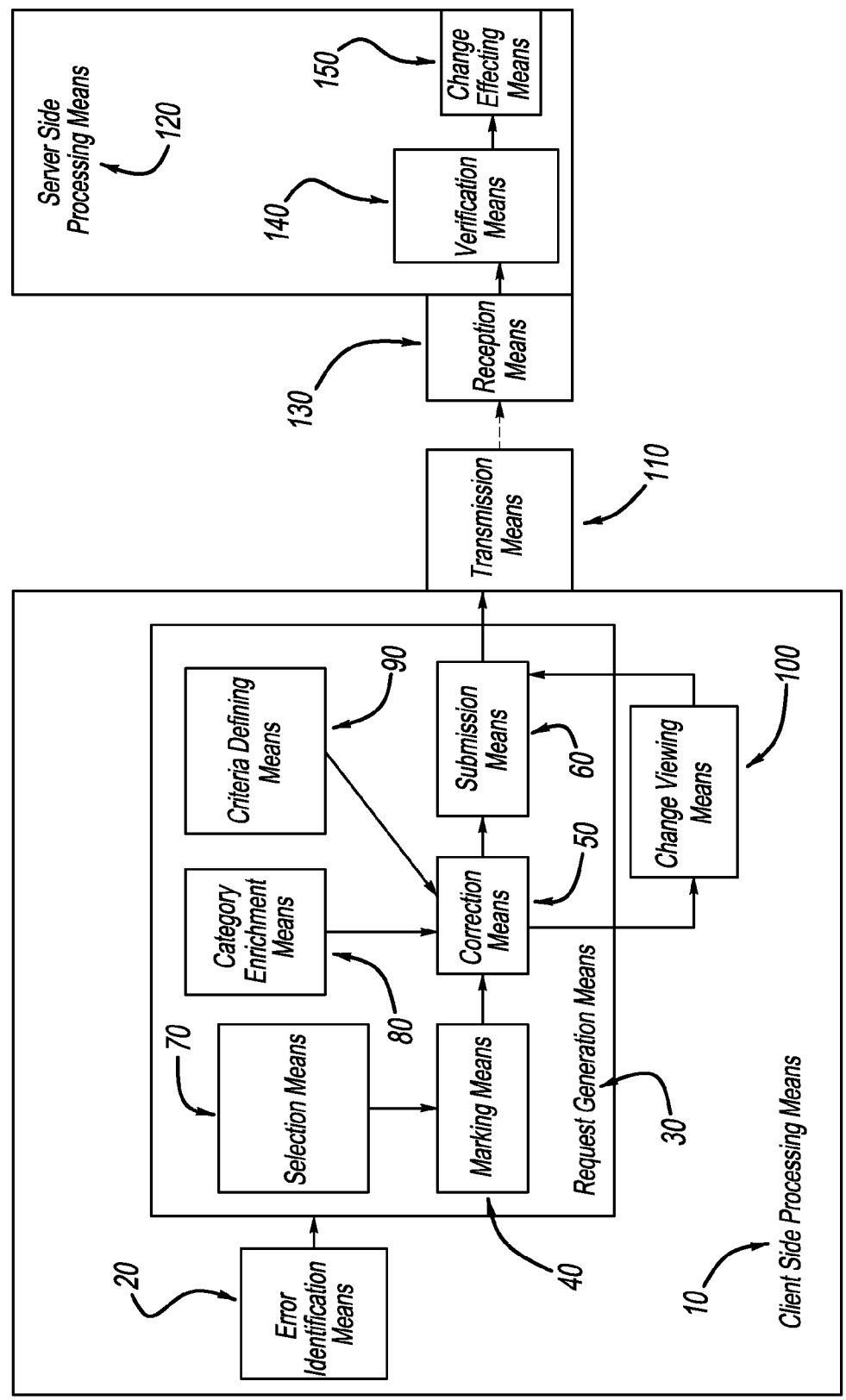

SYSTEM AND METHOD FOR CHANGING CATEGORISATION DATA IN RELATION TO SPEND ANALYSIS REPORTS IN REAL TIME

CROSS REFERENCES TO RELATED APPLICATIONS

The present invention claims priority to the Indian patent application No. 197/mum/2012, entitled "A System and Method for Changing Categorisation Data, in Relation to Spend Analysis Reports, in Real Time", filed Jan. 20, 2012, commonly assigned and herein incorporated by reference.

FIELD OF THE INVENTION

This invention relates to the field of information and computation systems. In particular, this invention relates to the field of information and computation systems in relation to spend data and spend analysis. More particularly, this invention relates to a system and method for changing categorisation data in real time.

BACKGROUND OF THE INVENTION

In Enterprise resource planning (ERP) systems, goods are centrally received at stores/warehouse (often called central receiving) and then distributed. Peer-to-peer (P2P) systems offer the advantage of allowing requesters (those who request goods) to receive goods at their desk (often called desktop receiving), thereby reducing work for the buyer/store-keeper and confirming that the user actually received the requested goods.

Quite often goods receipts are completely missed, and it is identified when invoices are being processed. Hence, proactive and reactive automated email alerts to requesters/buyers to create receipts will ensure the availability of receipts during invoice clearing, thereby saving cycle time.

In various spend analysis systems and processes, the analysis tool helps in classification of huge number of transactions into various categories of classified data. The classified data is analyzed through the tool and various reports are generated based on classified data. The various reports mention various saving opportunities based on the analysis of data and hence relate to spend analysis reports. The changes on classification feature play an important aspect in the tool, because the various reports which are generated based on classified data may not be very accurate meaning, in that, the reports may have errors due to wrong classification of data. E.g. suppose a report is generated for top five suppliers and the goods which they are offering such as Reynolds vendor offers pen and various stationary; however drill machine is also shown in the report under the vendor Reynolds. This is due to wrong classification.

There are challenges in the market to correct the classification or the errors in the classified data through the tool by the user itself that is in real time.

SUMMARY OF THE INVENTION

An object of the invention is to provide a system to change and/or correct classification information in real time. Another object of the invention is to provide a system to change classification information in real time in order to change analysis reports relating to spend analysis reports. Yet another object of the invention is to provide a system to change and/or correct classification information on the fly.

According to this invention, there is provided a system for changing categorization data, in relation to spend analysis reports, in real time, the system comprises: a processor unit; and a computer readable medium storing instructions executable by the processor unit comprises a client side processing means adapted to transmit a user generated request for change, in real time and a server side processing means adapted to receive said transmitted requested change, in real time, for effecting said requested change.

Typically, said client side processing means comprises error identification means in a report selected from a plurality of reports relating to spend analysis reports.

Typically, said client side processing means comprises request generation means adapted to send a request to a server side processing means which is accessed by an administrator in order to make or authorize recommended changes.

Typically, said client side processing means comprises: marking means adapted to mark a field on a report relating to spend analysis which requires changes; correction means adapted to specify corrections in the marked field; and submission means adapted to submit specified correction.

Typically, said client side processing means comprises: marking means adapted to mark a field on a report relating to spend analysis which requires changes; correction means adapted to specify corrections in the marked field; and submission means adapted to submit specified correction; wherein, said marking means further comprises a selection means adapted to select a report relating to spend analysis which requires changes and/or corrections.

Typically, said client side processing means comprises: marking means adapted to mark a field on a report relating to spend analysis which requires changes; correction means adapted to specify corrections in the marked field; and submission means adapted to submit specified correction; wherein, said correction means further comprises category enrichment means adapted to add replace categories to in a report relating to spend analysis.

Typically, said client side processing means comprises: marking means adapted to mark a field on a report relating to spend analysis which requires changes; correction means adapted to specify corrections in the marked field; and submission means adapted to submit specified correction; wherein, said correction means further comprises search criteria defining means adapted to define search criteria in order to view/review/establish effect of correction on a report relating to spend analysis based on the defined search criteria.

Preferably, said client side processing means comprises: marking means adapted to mark a field on a report relating to spend analysis which requires changes; correction means adapted to specify corrections in the marked field; and submission means adapted to submit specified correction; wherein, said correction means further comprises search criteria defining means adapted to define search criteria in order to view/review/establish effect of correction on a report relating to spend analysis based on the defined search criteria, said search criteria being populated using pre-defined dimensions.

Alternatively, said client side processing means comprises: marking means adapted to mark a field on a report relating to spend analysis which requires changes; correction means adapted to specify corrections in the marked field; and submission means adapted to submit specified correction; wherein, said correction means further comprises search criteria defining means adapted to define search criteria in order to view/review/establish effect of correction on a report relating to spend analysis based on the defined search criteria, said search criteria being populated using user-defined dimensions.

Typically, said client side processing means comprises request generation means adapted to send a request to a server side processing means which is accessed by an administrator in order to make or authorize recommended changes, said request generation means (RGM) comprises comment addition means adapted to add a comment in relation to corrections requested.

Typically, said client side processing means comprises change viewing means in order to view changes in a report relating to spend analysis due to change in category.

Typically, said client side processing means comprises transmission means adapted to transmit submitted corrections in relation to a specified field to a server side for authentication and/or verification.

Typically, said server side processing means comprises a reception means adapted to receive generated request by a user for verification.

Typically, said server side processing means comprises a change effecting means for effecting changes to a report relating to spend analysis upon verification.

Typically, said server side processing means comprises a resolving means adapted to resolve conflicting changes in each of said reports relating to spend analysis reports.

Typically, said server side processing means comprises authorizing means adapted to authorize changes in each of said reports relating to spend analysis reports.

According to this invention, there is provided a method for changing categorization data in real time, the method comprises the steps of: transmitting user generated request for change, in real time from a client side processing means and a receiving transmitted requested change, in real time, for effecting said requested change by said server side processing means.

Typically, said method comprises the step of identifying error identification means in a report selected from a plurality of reports relating to spend analysis.

Typically, said method comprises the step of sending a request to a server side which is accessed by an administrator in order to make or authorize recommended changes.

Typically, said method comprises the steps of: marking a field on a report relating to spend analysis which requires changes; specifying corrections in the marked field; and submitting specified correction.

Typically, said method comprises the steps of: marking a field on a report relating to spend analysis which requires changes; specifying corrections in the marked field; and submitting specified correction, wherein, said step of marking further comprises the step of selecting a category in a report relating to spend analysis which requires changes and/or corrections.

Typically, said method comprises the steps of: marking a field on a report relating to spend analysis which requires changes; specifying corrections in the marked field; and submitting specified correction, wherein, said step of specifying corrections further comprises the step of adding categories to a report relating to spend analysis.

Typically, said method comprises the steps of: marking a field on a report relating to spend analysis which requires changes; specifying corrections in the marked field; and submitting specified correction, wherein, said step of specifying corrections further comprises the step of defining search criteria in order to view/review/establish effect of correction on a report relating to spend analysis based on the defined search criteria.

Preferably, said method comprises the steps of: marking a field on a report relating to spend analysis which requires changes; specifying corrections in the marked field; and submitting specified correction, wherein, said step of specifying corrections further comprises the step of defining search criteria in order to view/review/establish effect of correction on a report relating to spend analysis based on the defined search criteria, said search criteria being populated using pre-defined dimensions.

Alternatively, said method comprises the steps of: marking a field on a report relating to spend analysis which requires changes; specifying corrections in the marked field; and submitting specified correction, wherein, said step of specifying corrections further comprises the step of defining search criteria in order to view/review/establish effect of correction on a report relating to spend analysis based on the defined search criteria, said search criteria being populated using user-defined dimensions.

Typically, said method comprises the step of sending a request to a server side which is accessed by an administrator in order to make or authorize recommended changes, and further comprises a step of adding a comment in relation to corrections requested.

Typically, said method comprises the step of viewing changes in a report relating to spend analysis due to change in category.

Typically, said method comprises the step of transmitting submitted corrections in relation to a specified field to a server side for authentication and/or verification.

Typically, said method comprises the step of receiving generated request by a user for verification.

Typically, said method comprises the step of effecting changes to a report relating to spend analysis upon verification.

Typically, said method comprises the step of resolving conflicting changes in each of said reports relating to spend analysis reports.

Typically, said method comprises the step of authorising changes in each of said reports relating to spend analysis reports.

BRIEF DESCRIPTION OF THE ACCOMPANYING DRAWINGS

Embodiments of the present invention are illustrated in the figures of the accompanying drawings. The figures are provided to aid thorough understanding of the invention and are exemplary rather than limiting. Based on the present teachings, person of ordinary skill in the art can contemplate various alternatives, variations and modifications to the illustrated embodiments within the scope of the invention disclosed herein.

The invention will now be described in relation to the accompanying drawings, in which the FIGURE illustrates a schematic of the system.

DETAILED DESCRIPTION OF THE INVENTION

The specific embodiments of the present invention are described below in greater detail. The following description of the specific embodiments refers at various places to the accompanying drawings and specific environments, applications, platforms, examples, computer screenshots, and implementations. Such description is provided for thorough understanding of the present invention and is illustrative rather than limiting.

According to this invention, there is provided a system for changing categorization data, in relation to spend analysis reports, in real time. The FIGURE illustrates a schematic of the system.

The system and method of this invention aims to allow a user to analyse the most accurate and high quality data by correcting discrepancies in reports relating to spend analysis.

In accordance with an embodiment of this invention, there is provided a client side processing means 10.

In accordance with another embodiment of this invention, the client side processing means comprises error identification means 20 in a report selected from a plurality of reports relating to spend analysis.

In accordance with yet another embodiment of this invention, the client side processing means comprises request generation means 30 adapted to send a request to a server side processing means which is accessed by an administrator in order to make or authorize recommended changes.

In accordance with still another embodiment of this invention, the request generation means comprises: marking means 40 adapted to mark a field on a report which requires changes; correction means 50 adapted to specify corrections in the marked field; and submission means 60 adapted to submit specified correction.

The marking means may further include a selection means 70 adapted to select a report, relating to spend analysis, which requires changes and/or corrections. This may be a report which has incorrect categories of classification.

The correction means may further include category enrichment means 80 adapted to add categories to a report relating to spend analysis.

The correction means may further include search criteria defining means 90 adapted to define search criteria in order to view/review/establish effect of correction on a report based on the defined search criteria. The search criteria may be populated using pre-defined dimensions or user-defined dimensions.

In accordance with another embodiment of this invention, the request generation means 30 comprises comment addition means adapted to add a comment in relation to corrections requested. These may be reasons for the change.

In accordance with yet another embodiment of this invention, there is provided a change viewing means 100 in order to view changes in a report relating to spend analysis due to change in category. This enables a user to make a decision whether the change is correct or not.

In accordance with another embodiment of this invention, there is provided a transmission means 110 adapted to transmit submitted corrections in relation to a specified field to a server side for authentication and/or verification.

In accordance with an embodiment of this invention, there is provided a server side processing means 120 adapted to receive, through a reception means 130, generated request by a user for verification.

In accordance with an embodiment of this invention, the server side processing means 120 comprises a verification means 140 adapted to verify changes to a report relating to spend analysis.

In accordance with an embodiment of this invention, the server side processing means 120 comprises a change effecting means 150 for effecting changes to a report relating to spend analysis upon verification.

While this detailed description has disclosed certain specific embodiments of the present invention for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

What is claimed is:

1. A system for changing categorization data, in relation to spend analysis reports, in real time, the system comprising:
   a processor unit; and
   a computer readable medium storing instructions executable by the processor unit comprising a client side processing means adapted to transmit a user generated request for changes, in real time, and a server side processing means adapted to receive said transmitted requested changes, in real time, for effecting said requested changes;
   wherein said client side processing means includes an error identification means in a report selected from a plurality of reports relating to spend analysis reports;
   wherein said client side processing means includes a request generation means adapted to send a request to a server side processing means which is accessed by an administrator in order to make or authorize recommended changes;
   wherein said server side processing means includes reception means adapted to receive a generated request by the user for verification;
   wherein said server side processing means includes change effecting means for effecting changes to a report relating to spend analysis upon verification;
   wherein said server side processing means includes authorizing means adapted to authorize changes in each report relating to spend analysis reports;
   wherein said server side processing means includes resolving means adapted to resolve conflicting changes in each report relating to spend analysis reports; and
   wherein said client side processing means further comprises request generation means adapted to send said request to said server side processing means which is accessed by the administrator in order to make or authorize said recommended changes, said request generation means comprising comment addition means adapted to add a comment in relation to said requested changes.

2. The system as claimed in claim 1, wherein said client side processing means further comprises:
   marking means adapted to mark a field on a report relating to spend analysis that requires changes;
   correction means adapted to specify corrections in the marked field; and
   submission means adapted to submit specified corrections.

3. The system as claimed in claim 2, wherein said marking means further comprises selection means adapted to select a report relating to spend analysis that requires changes or corrections.

4. The system as claimed in claim 2, wherein said correction means further comprises category enrichment means adapted to replace categories in a report relating to spend analysis.

5. The system as claimed in claim 2, wherein said correction means further comprises search criteria defining means adapted to define search criteria in order to view, review or establish an effect of a correction on a report relating to spend analysis based on the defined search criteria.

6. The system as claimed in claim 2, wherein said correction means further comprises search criteria defining means adapted to define search criteria in order to view, review or establish an effect of a correction on a report relating to spend analysis based on the defined search criteria, said search criteria being populated using pre-defined dimensions.

7. The system as claimed in claim 2, wherein said correction means further comprises search criteria defining means adapted to define search criteria in order to view, review or establish an effect of a correction on a report relating to spend analysis based on the defined search criteria, said search criteria being populated using user-defined dimensions.

8. The system as claimed in claim 1, wherein said client side processing means further comprises change viewing means in order to view changes in a report relating to spend analysis due to a change in category.

9. The system as claimed in claim 1, wherein said client side processing means further comprises transmission means adapted to transmit submitted corrections in relation to a specified field to a server side for authentication or verification.

10. A method for changing categorization data, in real time, comprising the steps of:
   transmitting a user generated request for changes, in real time, from a client side processing means;
   receiving a transmitted requested changes, in real time, for effecting said requested changes by said server side processing means;
   wherein said server side processing means includes reception means adapted to receive a generated request by the user for verification;
   wherein said server side processing means includes change effecting means for effecting changes to a report relating to spend analysis upon verification;
   wherein said server side processing means includes authorizing means adapted to authorize changes in each report relating to spend analysis reports;
   identifying an error in the report selected from a plurality of reports relating to spend analysis;
   sending a request to a server side that is accessed by an administrator in order to make or authorize recommended changes;
   resolving conflicting changes in each report relating to spend analysis reports; and
   wherein said client side processing means further comprises request generation means adapted to send said request to said server side processing means which is accessed by the administrator in order to make or authorize said recommended changes, said request generation means comprising comment addition means adapted to add a comment in relation to said requested changes.

11. The method as claimed in claim 10, further comprising the steps of:
   marking a field on a report relating to spend analysis that requires changes;
   specifying corrections in the marked field; and
   submitting specified corrections.

* * * * *